US011985515B2

(12) United States Patent
Raghavan et al.

(10) Patent No.: US 11,985,515 B2
(45) Date of Patent: May 14, 2024

(54) METHODS AND APPARATUSES FOR DYNAMIC ANTENNA ARRAY RECONFIGURATION AND SIGNALING IN MILLIMETER WAVE BANDS

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US); Yu-Chin Ou, San Diego, CA (US); Kobi Ravid, Closter, NJ (US); Ozge Koymen, Princeton, NJ (US); Juergen Cezanne, Ocean Township, NJ (US); Junyi Li, Franklin Park, NJ (US); Kapil Gulati, Belle Mead, NJ (US); Jung Ho Ryu, Fort Lee, NJ (US); Tianyang Bai, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 417 days.

(21) Appl. No.: 17/087,410

(22) Filed: Nov. 2, 2020

(65) Prior Publication Data

US 2021/0136598 A1 May 6, 2021

Related U.S. Application Data

(60) Provisional application No. 62/930,409, filed on Nov. 4, 2019.

(51) Int. Cl.
*H04W 16/28* (2009.01)
*H04B 7/0456* (2017.01)
(Continued)

(52) U.S. Cl.
CPC .......... *H04W 16/28* (2013.01); *H04B 7/0456* (2013.01); *H04B 7/0617* (2013.01);
(Continued)

(58) Field of Classification Search
None
See application file for complete search history.

(56) References Cited

U.S. PATENT DOCUMENTS 10,097,252 B2   10/2018 Jo et al.
10,588,089 B1   3/2020 Raghavan et al.
(Continued)

FOREIGN PATENT DOCUMENTS

WO   2015183472 A1   12/2015
WO   2018129300 A1   7/2018
(Continued)

OTHER PUBLICATIONS

International Search Report and Written Opinion—PCT/US2020/058813—ISA/EPO—dated Feb. 9, 2021.

*Primary Examiner* — Adnan Baig
(74) *Attorney, Agent, or Firm* — Arent Fox, LLP

(57) ABSTRACT

The present disclosure relates to dynamic antenna array reconfiguration and signaling in millimeter wave bands. A user equipment (UE) may detect an antenna array change condition. The UE may transmit a request for beam training for an antenna array configuration in response to the detecting. The request for beam training may include a requested antenna array configuration for the UE and an indication of beam weights to use with the requested antenna array configuration. A base station may determine whether to grant or deny the requested antenna array configuration for the UE. The UE may receive, from the base station, an indication of an antenna array configuration for the UE. The base station may transmit the number of reference signals as
(Continued)

a set of contiguous channel state information reference signals (CSI-RS). The UE may train the reconfigured active antenna array configuration based on the reference signals.

24 Claims, 12 Drawing Sheets

(51) Int. Cl.
    *H04B 7/06*        (2006.01)
    *H04B 17/318*    (2015.01)
    *H04L 5/00*       (2006.01)

(52) U.S. Cl.
    CPC ......... *H04B 7/0626* (2013.01); *H04B 7/0695* (2013.01); *H04B 17/318* (2015.01); *H04L 5/0051* (2013.01)

(56) References Cited

U.S. PATENT DOCUMENTS

| | | |
|---|---|---|
| 11,101,849 B2 | 8/2021 | Raghavan et al. |
| 2010/0279625 A1 | 11/2010 | Ko et al. |
| 2012/0275531 A1 | 11/2012 | Wu et al. |
| 2013/0315321 A1* | 11/2013 | Rajagopal ............ H04B 7/0695 375/260 |
| 2015/0230102 A1* | 8/2015 | Kang .................... H04B 7/0689 455/450 |
| 2016/0021548 A1 | 1/2016 | Raghavan et al. |
| 2016/0065290 A1* | 3/2016 | Zhu .................... H04W 52/0229 370/329 |
| 2016/0302146 A1* | 10/2016 | Rangan ............. H04W 52/0209 |
| 2016/0373223 A1* | 12/2016 | Quick, Jr. ............. H04H 20/38 |
| 2017/0026094 A1 | 1/2017 | Milleth et al. |
| 2018/0063693 A1 | 3/2018 | Chakraborty et al. |
| 2018/0145742 A1 | 5/2018 | Li et al. |
| 2019/0007121 A1* | 1/2019 | Zhinong ................ H04B 17/29 |
| 2019/0020402 A1 | 1/2019 | Gharavi et al. |
| 2019/0044600 A1 | 2/2019 | Milleth et al. |
| 2019/0150003 A1* | 5/2019 | He ....................... H04B 7/0617 342/368 |
| 2019/0199457 A1 | 6/2019 | Chopra et al. |
| 2019/0199492 A1* | 6/2019 | Na .......................... H04W 4/00 |
| 2019/0230606 A1 | 7/2019 | Ryu et al. |
| 2019/0288760 A1* | 9/2019 | Li ........................ H04B 7/0617 |
| 2020/0021349 A1* | 1/2020 | Chapman ............... H04B 7/043 |
| 2020/0107341 A1* | 4/2020 | Zhang ................. H04W 72/046 |
| 2020/0136704 A1 | 4/2020 | Liu et al. |
| 2020/0145159 A1 | 5/2020 | Tsai et al. |
| 2020/0169312 A1 | 5/2020 | Black et al. |
| 2020/0205012 A1 | 6/2020 | Bengtsson et al. |
| 2020/0304218 A1* | 9/2020 | Gao .................... H04B 7/06966 |
| 2021/0091974 A1* | 3/2021 | Elliott .................... H04L 12/462 |
| 2021/0194515 A1 | 6/2021 | Go et al. |
| 2021/0226681 A1 | 7/2021 | Raghavan et al. |
| 2022/0376767 A1* | 11/2022 | Nilsson ................ H04B 7/0862 |

FOREIGN PATENT DOCUMENTS

| | | | | |
|---|---|---|---|---|
| WO | WO-2018129300 A1 * | 7/2018 | ........... | H04B 7/0695 |
| WO | 2020005294 A1 | 1/2020 | | |

\* cited by examiner

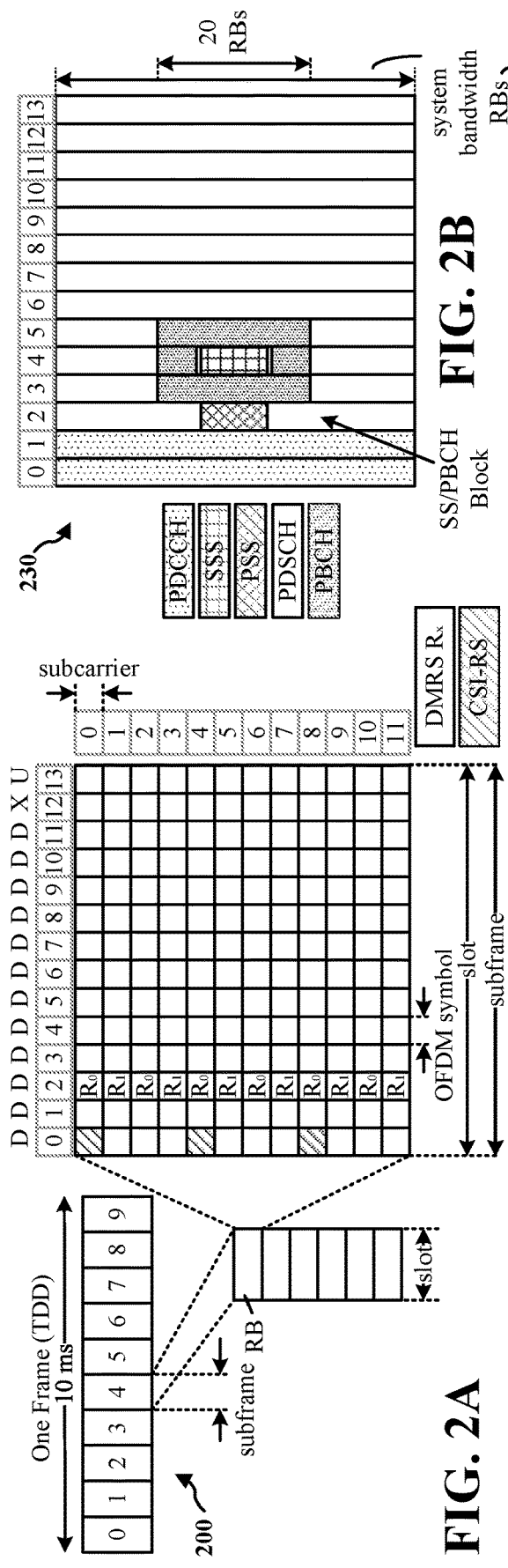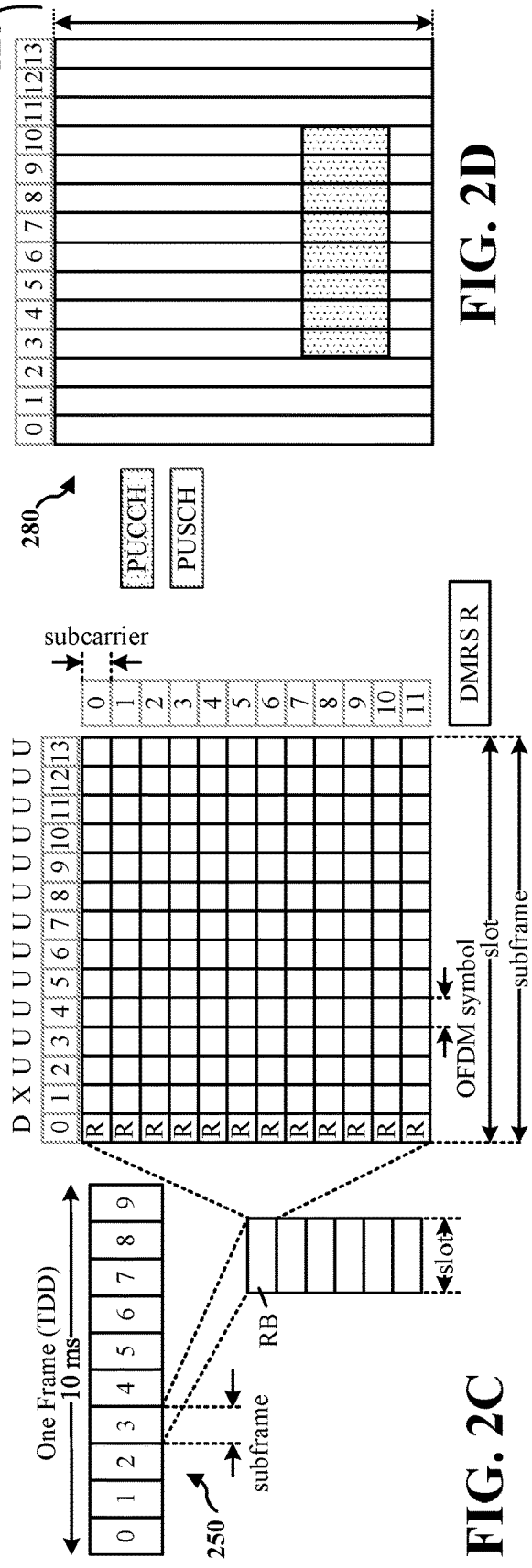

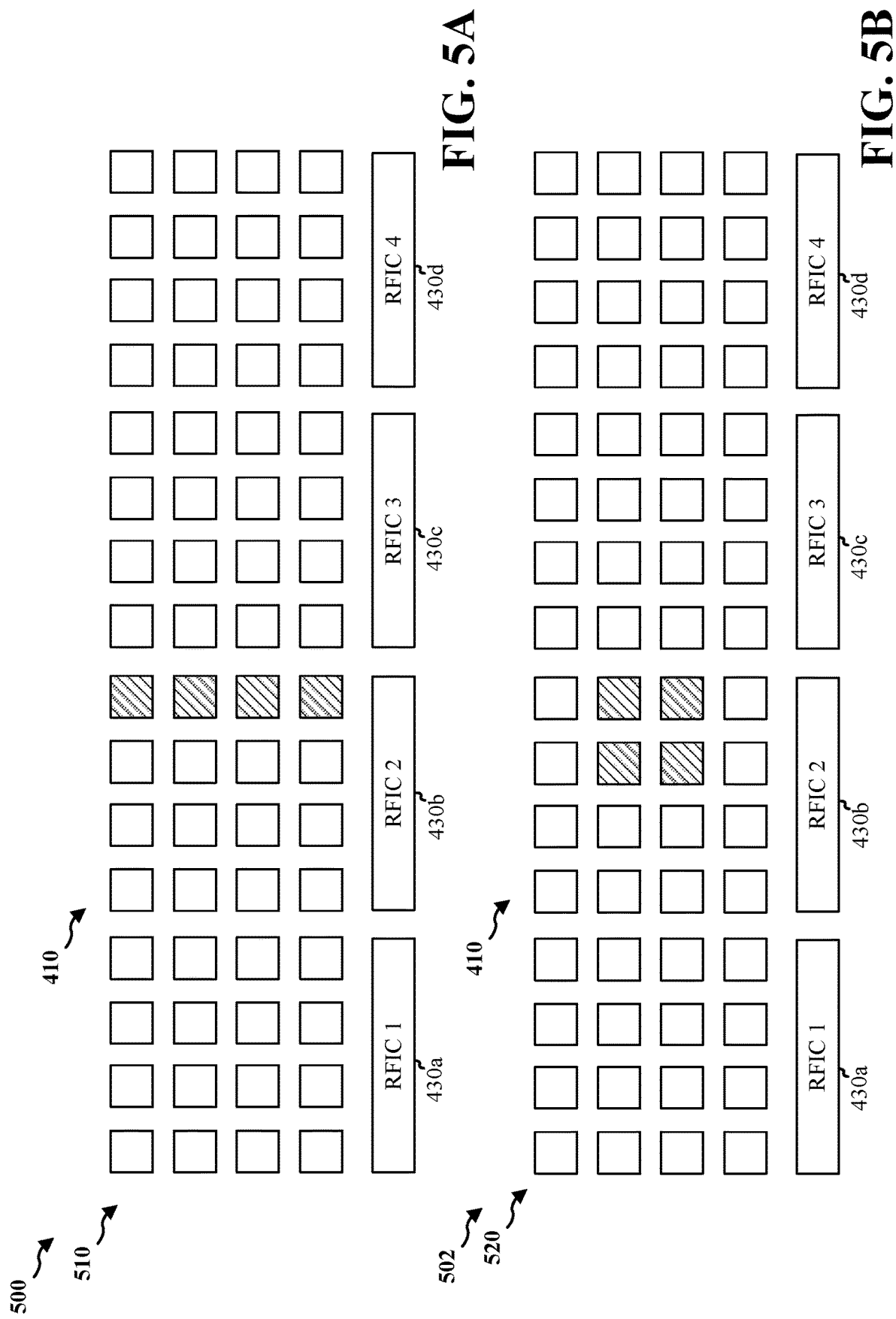

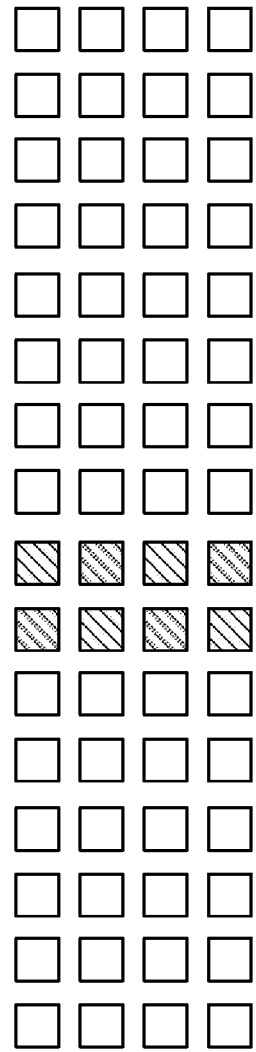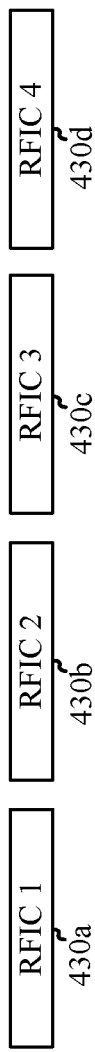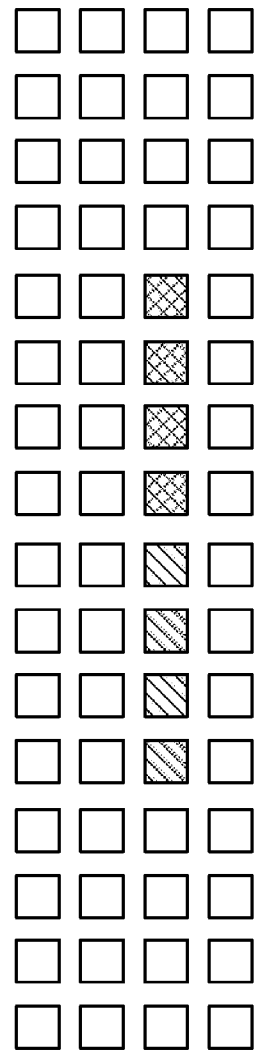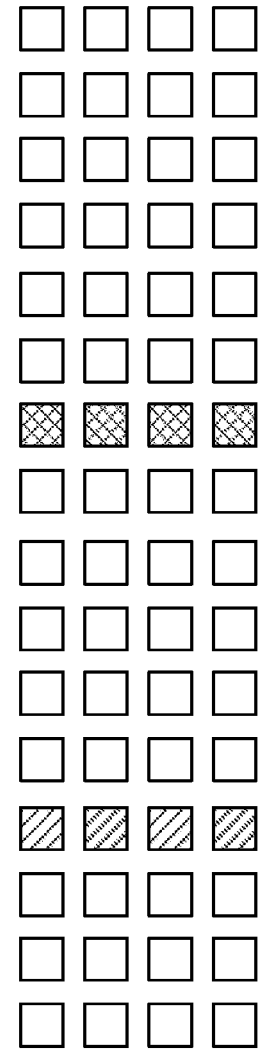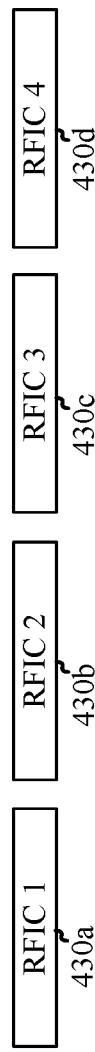
FIG. 6A    FIG. 6B    FIG. 6C

METHODS AND APPARATUSES FOR DYNAMIC ANTENNA ARRAY RECONFIGURATION AND SIGNALING IN MILLIMETER WAVE BANDS

CROSS REFERENCE TO RELATED APPLICATIONS

This application claims priority to U.S. Provisional Application Ser. No. 62/930,409 titled "METHODS AND APPARATUSES FOR DYNAMIC ANTENNA ARRAY RECONFIGURATION AND SIGNALING IN MILLIMETER WAVE BANDS," filed Nov. 4, 2019, which is assigned to the assignee hereof, and incorporated herein by reference in its entirety.

BACKGROUND

Technical Field

The present disclosure relates generally to communication systems, and more particularly, to dynamic antenna array reconfiguration and signaling in millimeter wave bands.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus (e.g., a user equipment (UE)) are provided. The method may include detecting, at the UE, an antenna array change condition. The method may include transmitting, from the UE, a request for beam training for an antenna array configuration in response to the detecting. The method may include receiving, from a base station, an indication of an antenna array configuration for the UE.

In an aspect, the disclosure provides an apparatus for wireless communication. The apparatus may include a memory; and at least one processor coupled to the memory. The processor may be configured to detect, at a UE, an antenna array change condition. The processor may be configured to transmit, from the UE, a request for beam training for an antenna array configuration in response to the detecting. The processor may be configured to receive, from a base station, an indication of an antenna array configuration for the UE.

In another aspect, the disclosure provides an apparatus for wireless communication. The apparatus may include means for detecting, at a UE, an antenna array change condition. The apparatus may include means for transmitting, from the UE, a request for beam training for an antenna array configuration in response to the detecting. The apparatus may include means for detecting receiving, from a base station, an indication of an antenna array configuration for the UE.

In another aspect, the disclosure provides a non-transitory computer-readable medium storing computer executable code, the code when executed by a processor causes the processor to: detect, at a UE, an antenna array change condition; transmit, from the UE, a request for beam training for an antenna array configuration in response to the detecting; and receive, from a base station, an indication of an antenna array configuration for the UE.

The antenna array change condition may be based on an angular spread of dominant and sub-dominant clusters in a channel between the base station and the UE.

The antenna array change condition may be based on a power consideration of the UE.

The antenna array change condition may be based on a thermal consideration of the UE.

The antenna array change condition may be based on support for additional radio-frequency chains utilizing a hybrid beamforming architecture.

The request for beam training may include a request to change an active antenna array configuration of the UE to a requested antenna array configuration.

The request for beam training may include an indication of beam weights to use with the requested antenna array configuration.

The indication of beam weights may be a pointer to an analog beamforming codebook index.

The indication of the antenna array configuration for the UE may indicate the requested antenna array configuration and a number of reference signals to use for beam training with the requested antenna array configuration.

The method of wireless communication may further include configuring the antenna array based on the requested antenna array configuration to activate a reconfigured active antenna array configuration; training the reconfigured active antenna array configuration based on the reference signals; and transmitting a set of reference signal received powers (RSRPs) and associated beam indices to the base station.

The indication of the antenna array configuration for the UE may indicate the active antenna array configuration.

In an aspect of the disclosure, a method, a computer-readable medium, and an apparatus (e.g., a base station) are provided. The method may include receiving, at a base station from a UE, a request for beam training for a requested antenna array configuration. The method may include determining whether to grant or deny the requested antenna array configuration. The method may include transmitting, from a base station, an indication of an antenna array configuration for the UE.

In an aspect, the disclosure provides an apparatus for wireless communication. The apparatus may include a memory; and at least one processor coupled to the memory. The processor may be configured to receive, at a base station from a UE, a request for beam training for a requested antenna array configuration. The processor may be configured to determine whether to grant or deny the requested antenna array configuration. The processor may be configured to transmit, from a base station, an indication of an antenna array configuration for the UE.

In another aspect, the disclosure provides an apparatus for wireless communication. The apparatus may include means for receiving, at a base station from a UE, a request for beam training for a requested antenna array configuration. The apparatus may include means for determining whether to grant or deny the requested antenna array configuration. The apparatus may include means for transmitting, from a base station, an indication of an antenna array configuration for the UE.

In another aspect, the disclosure provides, a non-transitory computer-readable medium storing computer executable code, the code when executed by a processor causes the processor to: receive, at a base station from a UE, a request for beam training for a requested antenna array configuration; determine whether to grant or deny the requested antenna array configuration; and transmit, from a base station, an indication of an antenna array configuration for the UE.

The request for beam training may indicate support for additional radio-frequency chains utilizing a hybrid beamforming architecture.

The request for beam training may include an indication of beam weights to use with the requested antenna array configuration.

The indication of beam weights may be a pointer to an analog beamforming codebook index.

The indication of the antenna array configuration for the UE may indicate the requested antenna array configuration and a number of reference signals to use for beam training with the requested antenna array configuration.

The method of wireless communication may further include transmitting the number of reference signals as a set of contiguous channel state information reference signals (CSI-RS).

The method of wireless communication may further include receiving a set of reference signal received powers (RSRPs) and associated beam indices from the UE; and selecting a beam from the associated beam indices for transmissions to the UE.

The indication of the antenna array configuration for the UE may indicate a current active antenna array configuration in response to the determination to deny the requested antenna array configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G/NR frame.

FIG. 2B is a diagram illustrating an example of DL channels within a 5G/NR subframe.

FIG. 2C is a diagram illustrating an example of a second 5G/NR frame.

FIG. 2D is a diagram illustrating an example of a UL channels within a 5G/NR subframe.

FIG. 5A is a schematic diagram of a first example active antenna configuration including a linear array.

FIG. 5B is a schematic diagram of a second example active antenna configuration including a planar array.

FIG. 6A is a schematic diagram of a third example active antenna configuration including a planar array.

FIG. 6B is a schematic diagram of a fourth example active antenna configuration including a linear array.

FIG. 6C is a schematic diagram of a fifth example active antenna configuration including a distributed linear array.

DETAILED DESCRIPTION

Figure 1:
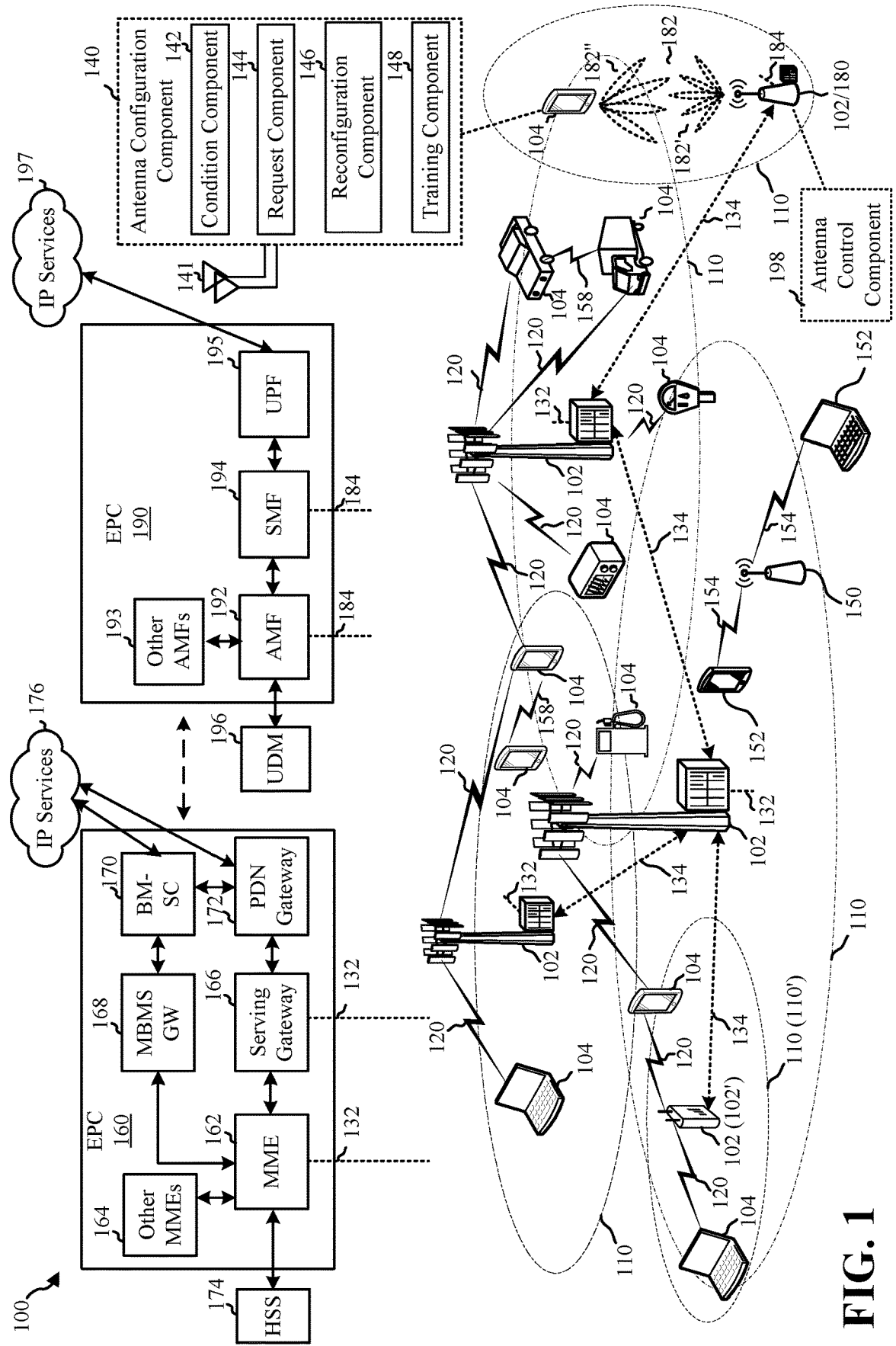
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

5G NR systems may operate in millimeter wave (mm-Wave) bands. For example, communication systems may be described based on the frequency band in which the system operates. For instance, frequency range 1 (FR1) may refer to frequencies up to 6 GHz, FR2 may refer to frequencies between ~24 GHz and 52.6 GHz, FR3 may refer to frequencies between 6 GHz and ~24 GHz, and FR4 may refer to frequencies beyond 52.6 GHz.

FR4 and beyond systems allow more "degrees of freedom" in terms of antenna array arrangement, placement and dynamic selection (e.g., at a symbol, slot, or collection of slots level). Generally, in sub-6 GHz/FR1 or FR2 systems, all antennas are used, or some fixed a priori subsets of antennas are used. For instance, a device may include a linear antenna array and a subset of the antennas in the array may be active. Antenna configuration may be used for limited purposes such as hierarchical beamforming where beam change associated with subarray change is associated with a clear mapping across antennas. In contrast, at FR4 (and beyond), arbitrary subsets of antennas within a large two-dimensional array can be selectively activated at a symbol or slot or collection of slots level.

The degrees of freedom are discussed with respect to two hypothetical systems (a first system at 30 GHz which is FR2 and a second system at 120 GHz, which may be considered to be FR4 or possibly beyond FR4 (e.g., "FR5"). Wavelength ($\lambda$) at 120 GHz is 4 times smaller than $\lambda$ at 30 GHz. Accordingly, the same physical aperture/area could be used at 30 GHz and 120 GHz for antenna array construction at both frequencies. For example, a system may include simultaneous operations at multiple carriers with a flexible/collocated antenna array using multiple antenna feeds for different bands. For the same physical aperture at 30 GHz, 4 times more antennas can be packed at 120 GHz in each dimension (azimuth or elevation). So the aperture for a 4×1 array at 30 GHz can fit a 16×4 antenna array at 120 GHz. Thus, moderate sized antenna arrays (e.g., for mobile devices) may become extremely large arrays as carrier frequencies increase.

Antenna arrays are (relatively) low cost, but antenna arrays are controlled by radio frequency integrated circuits (RFICs), which may include mixers, up/down converters, power amplifiers (PAs), low noise amplifiers (LNAs), phase shifters, automatic gain control (AGC), etc. The RFIC may be a relatively expensive component compared to an antenna in an integrated antenna array. For commercial and operational tradeoffs (e.g., cost, complexity, power, die size, etc.), only a certain number of antennas can be controlled by an RFIC. Typically, the number of antennas controlled by an RFIC is between 4-16. But this number could change as technology scales/changes with time. Thus, the use of large antenna arrays may require more RFICs. To control costs (both in manufacturing and operation (e.g., energy)), only a subset of the number of RFICs needed to control the whole array may be included in a device and only a subset of the included RFICs may be activated.

In an aspect, the present disclosure provides for dynamic switching across these degrees of freedom based on channel/link, power, thermal conditions and key performance indicator (KPI) targets. In particular, the present disclosure provides for communication between the UE and a base station to select and train a new active antenna configuration, especially when the new active antenna configuration is significantly different from a previous active antenna configuration. For example, a change to a subset of active antennas may be performed autonomously by the UE (to dynamically control beamwidth of beams used in beamforming) whereas addition of a new active antenna may involve communications between the UE and the base station. In an implementation, the UE may detect an antenna configuration change condition that triggers the need for an antenna configuration change. An antenna configuration change condition may refer to a condition detected at a UE that indicates a potential for performance improvement if a current antenna configuration is changed. An antenna configuration change condition may be based on a predicted performance for a new antenna configuration in comparison to the current antenna configuration. For example, an antenna configuration change condition may be based on one or more of: beamwidth change, power or thermal considerations, or support for more RF chains with hybrid beamforming. In response to detecting an antenna configuration change condition, the UE may transmit a request for beam training to the base station. The request for beam training may include a requested antenna array configuration. The base station may accept or deny the antenna array configuration change request by transmitting a response including an indication of an antenna array configuration for the UE. If the base station accepts the requested antenna array configuration, the base station and the UE may perform beam training using a number of reference signals transmitted by the base station.

Particular implementations of the subject matter described in this disclosure can be implemented to realize one or more of the following potential advantages. The UE may autonomously request an antenna configuration based on conditions detectable at the UE. Accordingly, the UE may be more likely to quickly move to an antenna configuration that satisfies performance targets of the UE. For example, the UE may be able to autonomously reduce power consumption or temperature as needed. The change of antenna configuration may also initiate a beam training procedure. Accordingly, the base station may update transmit and receive beams for use with the new antenna configuration. The updated beams may be selected to provide the best signal quality.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network (e.g., a 5G Core (5GC)) 190). The base stations 102 may include macrocells (high power cellular base station) and/or small cells (low power cellular base station). The macrocells include base stations. The small cells include femtocells, picocells, and microcells.

In an aspect, a UE 104 may include an antenna configuration component 140 that changes an active antenna array configuration of the UE. The antenna configuration component 140 may include a plurality of antennas 141 that are arranged as an array and which may be selectively activated according to an active antenna array configuration. The antenna configuration component 140 may include a condition component 142 configured to detect an antenna array configuration change condition, a request component 144 configured to transmit a request for beam training including a requested active antenna configuration, a reconfiguration component 146 configured to configure the plurality of antennas 141 according to a received antenna array configuration change response, and a training component 148 configured to perform beam training for the requested active antenna configuration.

Figure 12:
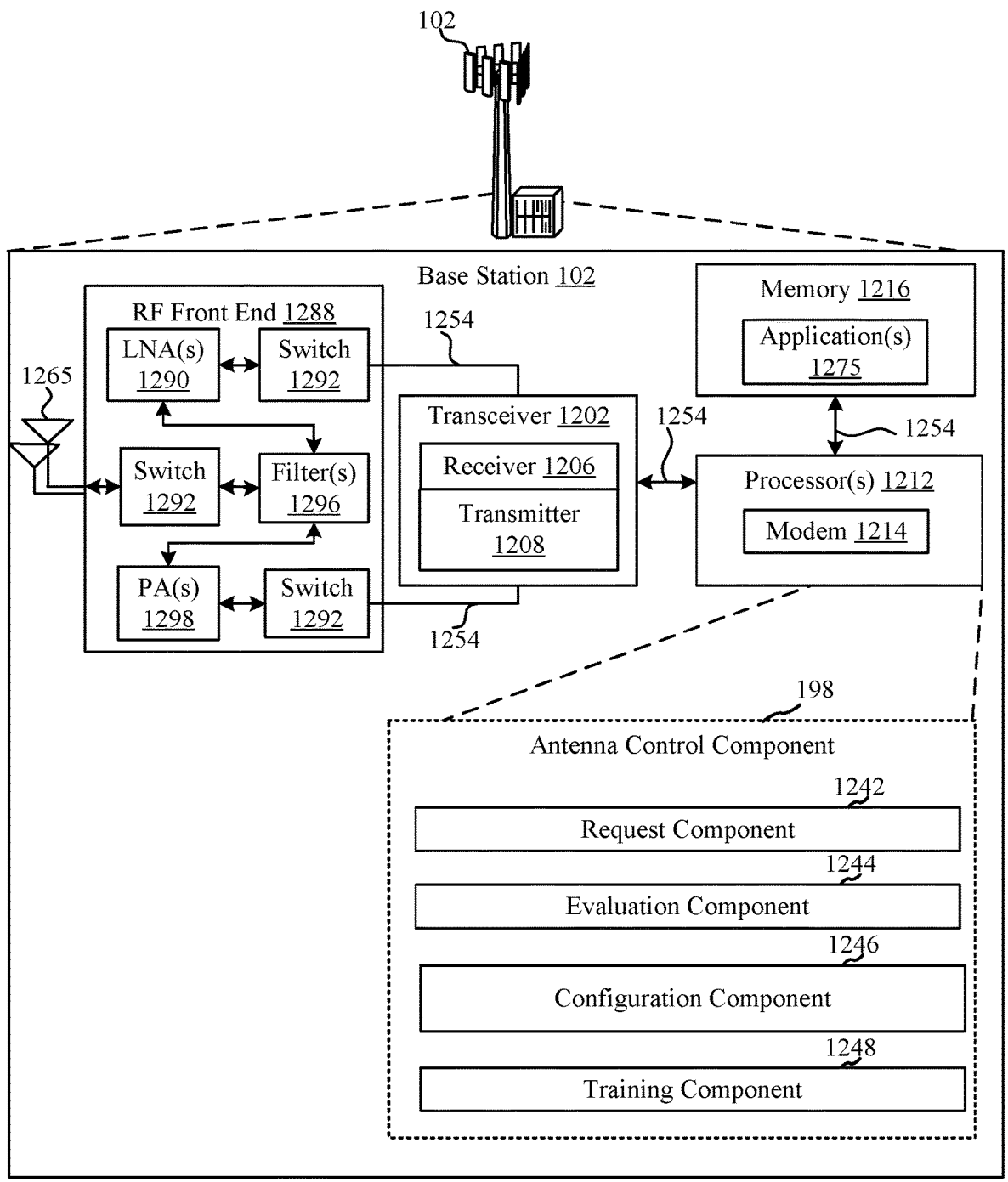
FIG. 12 is a schematic diagram of example components of the base station of FIG. 1.

In another aspect, a base station 102 may include an antenna control component 198 that operates in conjunction with the antenna configuration component 140. For example, as illustrated in FIG. 12, the antenna control component 198 may include a request component 1242 configured to receive the request for beam training, an evaluation component 1244 configured to determine whether to grant or deny the request, a configuration component 1246 configured to transmit the antenna array configuration change response, and a training component 1248 configured to perform beam training for the new active antenna configuration.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The backhaul links 132 may be wired or wireless.

The base stations 102 configured for 5G NR (collectively referred to as Next Generation RAN (NG-RAN)) may interface with 5GC 190 through backhaul links 184. The backhaul links 184 may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu=0$ to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu} * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
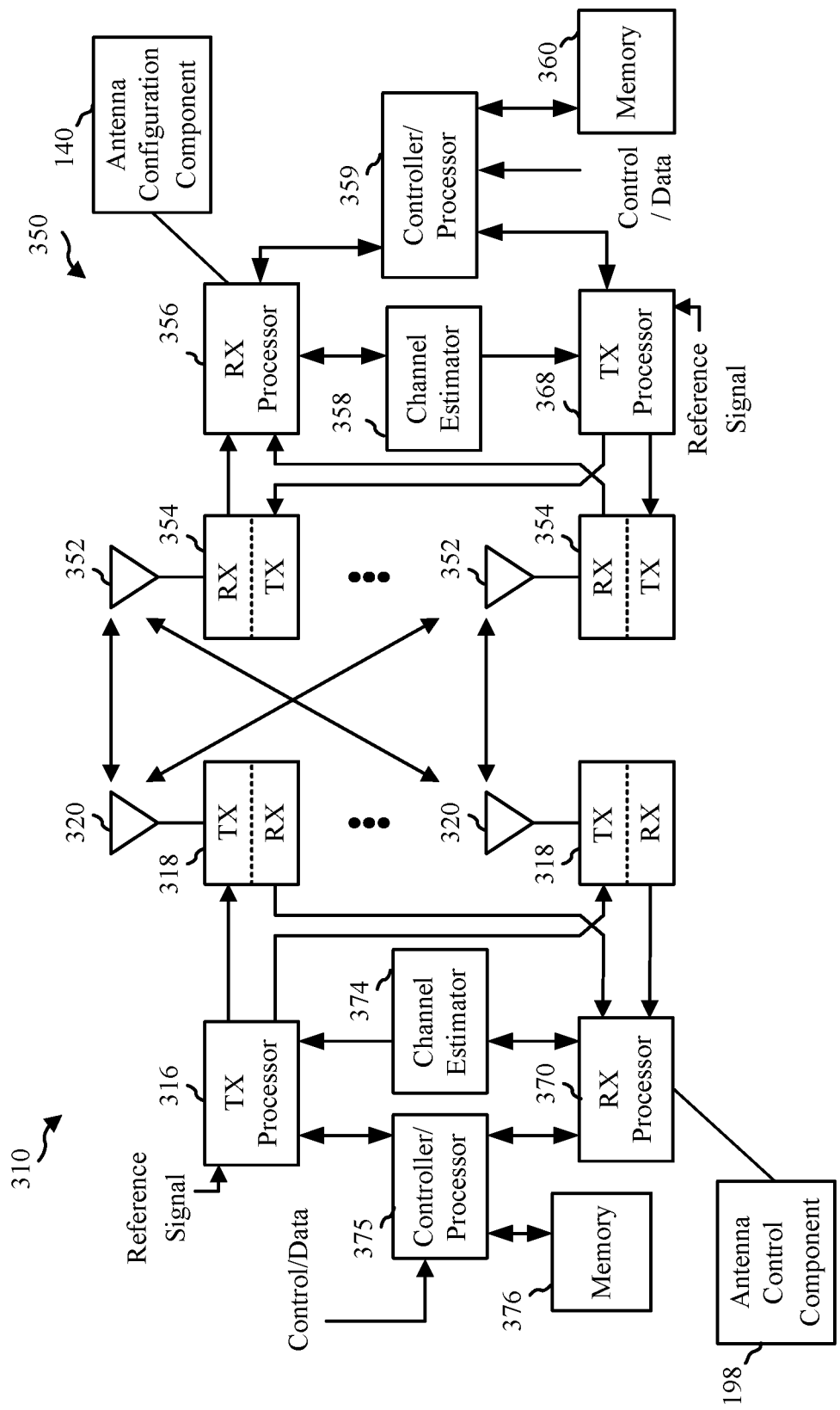
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing (e.g., according to the active antenna array configuration). The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the antenna configuration component 140 of FIG. 1 at the UE 104. At least one of the TX processor 316, the RX processor 370, and the controller/processor 375 may be configured to perform aspects in connection with the antenna control component 198 of FIG. 1 at the base station 102.

Figure 4:
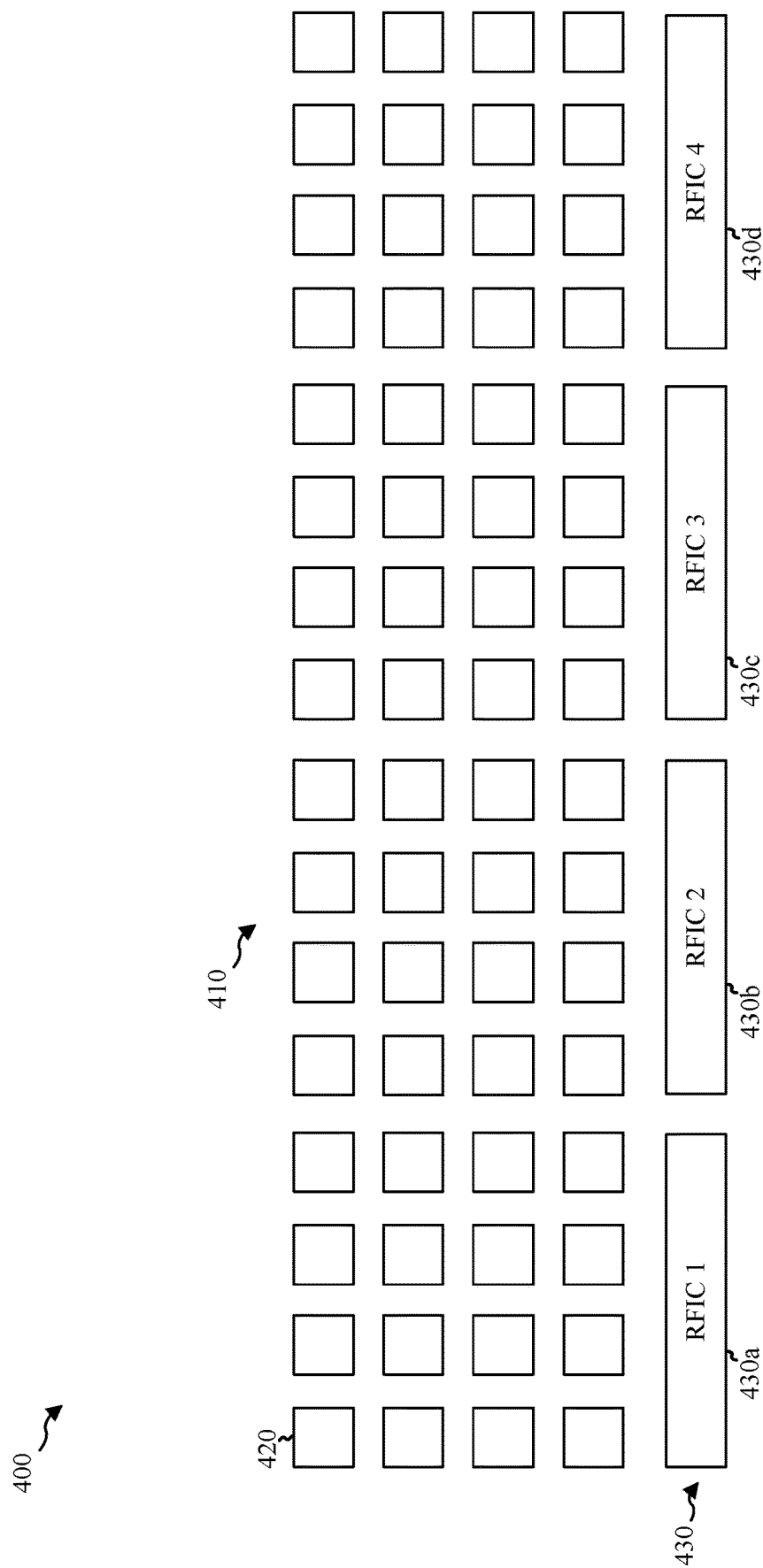
FIG. 4 is a schematic diagram of an example antenna array for a UE.

Turning to FIG. 4, a schematic diagram 400 of an example antenna array 410 includes a plurality of antennas 420 and a plurality of RFICs 430 (e.g., RFICs 430a, 430b, 430c, 430d). The antenna array 410 may be located in the UE 104 (e.g., as the antennas 141). The antenna array 410 may include up to four RFICs 430 for controlling multiple antenna modules or panels via RF switches. In the illustrated example, each RFIC 430 can control up to 16 antennas. Putting more RFICs in the UE may increase production costs. A common RFIC bank with dynamic switching across antenna modules/panels and subarrays may allow flexibility for an RFIC to control multiple antennas. Complex feed line crossings is the tradeoff for flexibility. In an alternative example, if each RFIC can control 8 antennas per RFIC, the 16×4 array at 120 GHz may use 8 RFICs (64 antennas/8 antennas per RFIC).

As discussed in further detail below, in order to reduce power consumption, the antenna configuration component 140 may configure a subset of the antennas 420 as active antennas. In some scenarios, the antenna configuration component 140 may limit the number of active RFICs 430 to save power.

Turning to FIG. 5A, a schematic diagram 500 includes a first example active antenna configuration 510 for the example antenna array 410. The active antenna configuration 510 includes a 4×1 linear array of antennas 420 that are each controlled by RFIC 430b. In FIG. 5B, a schematic diagram 502 includes a second example active antenna configuration 520. The second example active antenna configuration 520 includes a 2×2 planar array of antennas 420 that are each controlled by RFIC 430b.

In an aspect, the antenna configuration component 140 may switch between the 4×1 linear array of active antenna configuration 510 and the 2×2 planar array of active antenna configuration 520 without loss in equivalent isotropically radiated power (EIRP). For example, at the same EIRP, the 4×1 linear array of active antenna configuration 510 may produce a relatively wider elevation angular spread and a relatively narrower azimuth angular spread compared to the 2×2 planar array of active antenna configuration 520, which may produce a relatively wider azimuth and a relatively narrower elevation angular spread. Accordingly, the antenna configuration component 140 may trade off the appropriate angular spreads in azimuth and elevation by changing the active antenna configuration.

Turning to FIGS. 6A, 6B, and 6C, three example antenna configurations 610, 620, and 630, with each controlled by two RFICs 430 are shown. In a first example active antenna configuration 610, the RFIC 430b may control a 4×2 planar array. In a second example active antenna configuration 620, the RFIC 430b and the RFIC 430c may control an 8×1 linear array. In a third example antenna configuration 630, the RFIC 430a and the RFIC 430c may control a 4×2 distributed array with two pieces of 4×1 each.

In an aspect, the antenna configuration component 140 may switch between the active antenna configurations 610, 620, and 630. The 4×2 array of active antenna configuration 610 may consume less power as the array is controlled by a single RFIC 430b. The 4×2 array of active antenna configuration 610 may still have wider beamwidths than the active antenna configuration 510. Accordingly, the active antenna configuration 610 may be suitable for a scenario where angular spread of a dominant cluster is wide. The 8×1 array of the active antenna configuration 620 may consume more power than the active antenna configuration 610 as the array is controlled by two RFICs 430b and 430c. The active antenna configuration 620 may have narrower beamwidths in azimuth and wider beamwidth in elevation. Accordingly, the active antenna configuration 620 may be suitable for a scenario where angular spread of the dominant cluster is matched to the beam shape/pattern produced. The 4×2 distributed array of the active antenna configuration 630 may consume more power than the active antenna configuration 610 as the active antenna configuration 630 is controlled by two RFICs 430a and 430c. The active antenna configuration 630 may be useful with hybrid beamforming as antennas are widely spaced and hence uncorrelated, which allows use of independent data streams across each 4×1 array.

In an aspect, dynamically changing the active beam configuration when there are more degrees of freedom in the possible configuration may have greater impact on the base station than dynamic changes to a linear array. For example, a UE may change an active antenna configuration among a subset of antennas in a linear array without a need to change a base station beam. For instance, a beamwidth may become wider as a UE changes from a 4×1 array to a 2×1 array to a 1×1 array. The 1×1 array is a subset of the 2×1 array, which is a subset of the 4×1 array. In contrast, with additional degrees of freedom (e.g., as in the above example active antenna configurations), the antennas of a second array may have no relationship with antennas of a first array. Thus, beamwidths of the different active antenna configurations may not be related. The base station may need to change its beam in response to a UE antenna array configuration or beam change. In an aspect, the base station may control a UE antenna array configuration or a beam change, at least where the change results in activation or deactivation of an antenna that is unrelated to the previous configuration or the new configuration.

Figure 7:
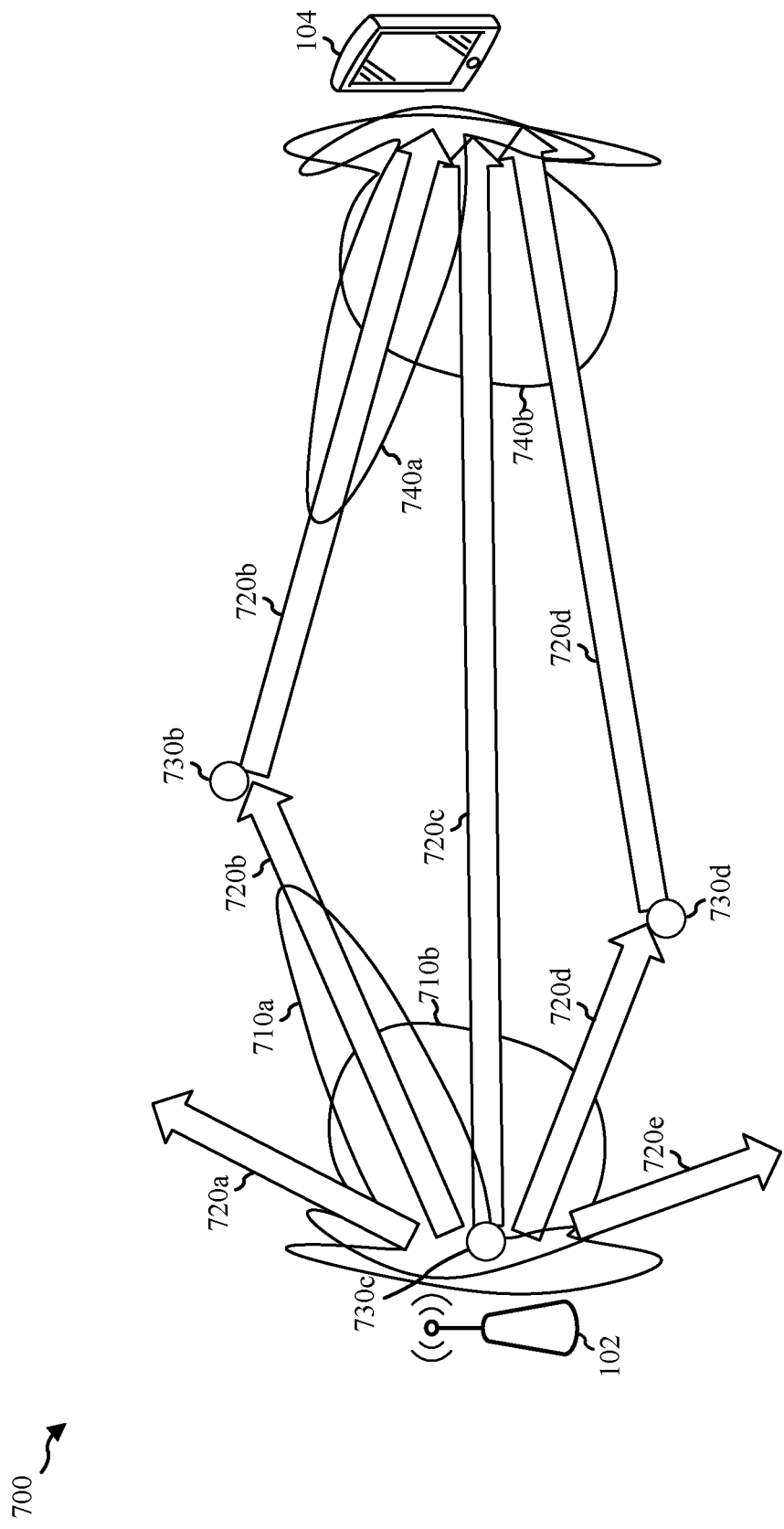
FIG. 7 is a conceptual diagram showing example beams and transmission paths in a radio channel.

Turning to FIG. 7, a conceptual diagram 700 includes beams 710 transmitted from a base station 102 to a UE 104. The beams 710 may be the result of different antenna configurations at the base station 102, which may typically include a large antenna array for beam steering. For example, the beams 710 may include a first beam 710a that is relatively narrow and a second beam 710b that is relatively wide. The base station 102 may control beam weights to steer the beams 710 in a particular direction. For example, a channel may include multiple paths 720 (e.g., paths 720a-720e) between the base station 102 and the UE 104. For instance, a direct path 720c may exist if there is a line of sight between the base station 102 and the UE 104. An RF signal may also follow an indirect path. For example, the signal may reflect off an object such as a building, vehicle, or window. From the perspective of the UE 104, the signal may appear to arrive from a cluster 730. A cluster (e.g., clusters 730b-730d) may be a reflected or a diffracted source of a signal that arrives at the UE 104. For example, a cluster 730c may correspond to the base station 102 and the clusters 730b and 730d may correspond to objects that reflect the signals in the indirect paths 720b and 720d, respectively. Other paths such as path 720a and 720e may not reach the UE 104 with sufficient signal strength. The UE 104 may have an active antenna configuration that generates a receive beam 740 (e.g., receive beams 740a and 740b). For example, the receive beam 740a may be generated by a first active antenna configuration and the receive beam 740b may be generated by a second active antenna configuration. The UE 104 may control antenna weights to steer the receive beam 740 towards one or more clusters 730. A strongest cluster may be referred to as a dominant cluster and other clusters may be referred to as sub-dominant clusters.

The UE 104 may dynamically change an active antenna configuration to focus on one or more clusters. For example, the UE 104 may use the active antenna configuration that generates the receive beam 740a when the cluster 730b is the dominant cluster. The UE 104 may change the active antenna configuration to generate the receive beam 740b when there are multiple strong clusters. In the case of a linear antenna array, changing between subsets of the antennas may affect the beamwidth of the receive beam 740, but may not have a great impact on the direction of other dimensions of the receive beam 740. When the UE 104 has a larger antenna array with more degrees of freedom, a change in the active antenna configuration may change the receive beam 740 in a different dimension. For example, the beam may expand or contract in the azimuth or elevation dimension. Accordingly, as the degrees of freedom in active antenna configuration selection increase, there is a greater likelihood that the best beam for the base station 102 will also change.

Figure 8:
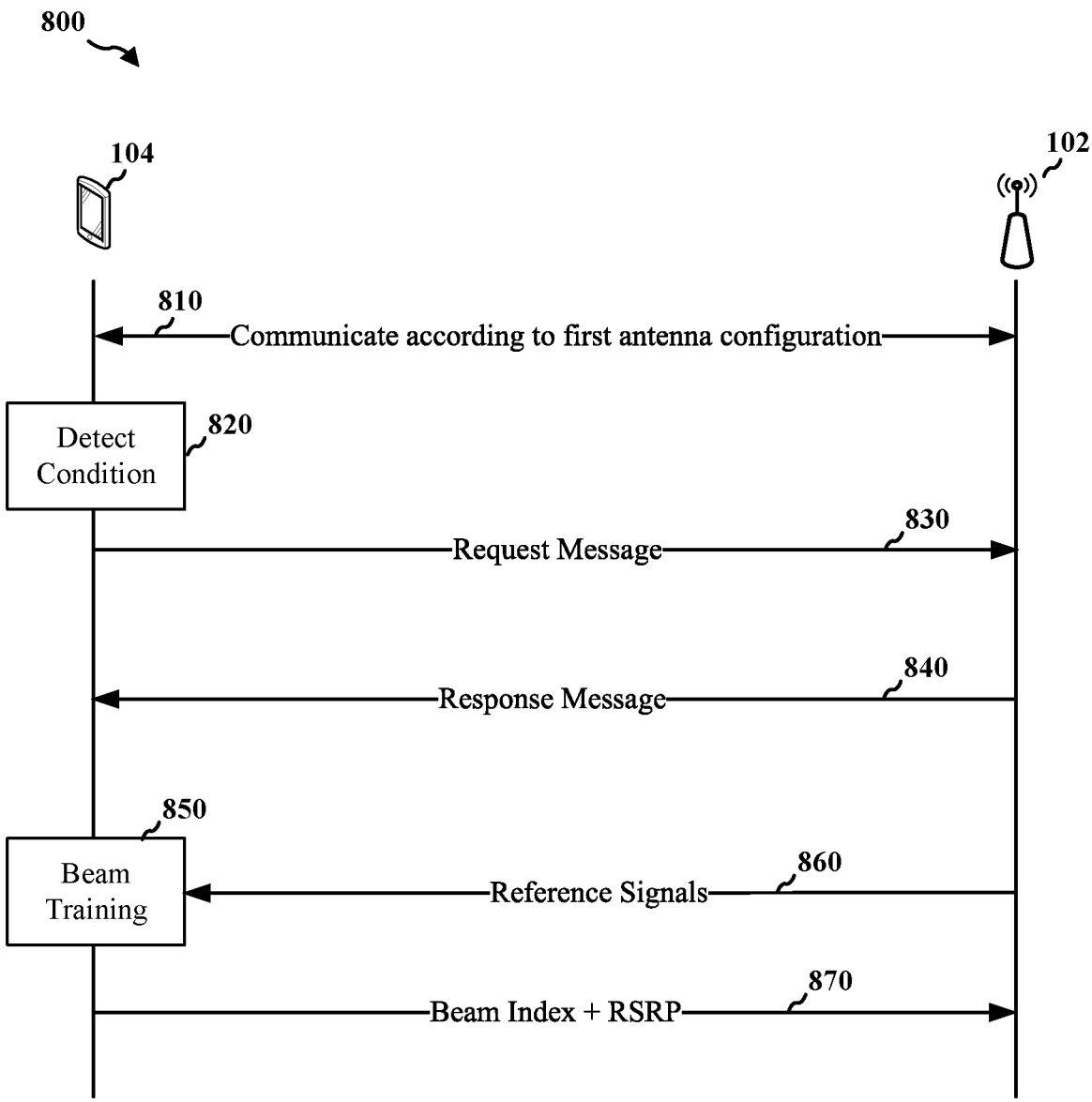
FIG. 8 is a message diagram showing example signaling for reconfiguring a UE antenna array.

FIG. 8 is a message diagram 800 illustrating example processes and messages for dynamically changing an active antenna configuration of a UE 104. Initially, the UE 104 may communicate messages 810 with the base station 102 according to a first antenna configuration. For example, the first antenna configuration may be a default antenna configuration, the base station 102 may configure the UE 104 with the first antenna configuration (e.g., using RRC signaling), or the first antenna configuration may be dynamically selected by the UE 104.

At process block 820, the UE 104 may detect an antenna configuration change condition. The antenna configuration change condition may be based on one or more of: beamwidth change, power or thermal considerations, or support for more RF chains with hybrid beamforming. For example, as discussed above with respect to FIG. 7, the UE 104 and/or antenna configuration component 140 may determine (e.g., based on reference signals), that a different active antenna configuration would produce a receive beam 740 that would provide better performance (e.g., greater signal strength). For example, a new active antenna configuration may capture an angular spread of dominant and/or sub-dominant clusters in the RF channel. As another example, the UE 104 and/or antenna configuration component 140 may determine that power consumption of the current active antenna configuration is too great (e.g., based on measured power consumption or battery charge) or that a temperature of the UE 104 or component thereof is too great (e.g., based on a thermal sensor). In another aspect, the UE 104 and/or antenna configuration component 140 may determine that support for additional RF chains may be desirable, for example, if a higher data rate is needed. The UE 104 and/or antenna configuration component 140 may determine that an active antenna configuration such as the example active antenna configuration 630 may support an additional RF chain to receive an additional stream. The above antenna change conditions may be based on measurements performed at the UE or internal status of the UE that may not be reported to the base station. Accordingly, by detecting the antenna change condition and initiating an antenna array configuration change and beam training, the UE may improve performance targets of the UE that may not be detectable by the network.

In response to detecting an antenna configuration change condition in process block 820, the UE 104 may transmit a request message 830 requesting beam training for an antenna array configuration. Beam training may refer to a process in which the UE 104 and the base station 102 communicate using different beams in order to select a beam for future communications. For example, the base station 102 may transmit reference signals using different beams, and the UE may feedback a selected beam and/or measurements of the different beams. The request message 830 may indicate a requested antenna array configuration (e.g., one of active antenna configurations 510, 520, 610, 620, 630). For example, the requested antenna array configuration may be based on the detected antenna array change condition. In some implementations, the request message 830 may be referred to as an antenna array configuration change request message. In an aspect, the antenna array configuration may include an indication of beam weights to use with the requested antenna array configuration. For example, the UE 104 may select the beam weights based on measurements of reference signals received during communication with the current antenna array configuration. For example, the beam weights may be based on a prediction of a best beam to use with the requested antenna array configuration. The beam weights may be indicated as a codebook entry, for example, from a codebook defined in a standard, a regulation, or a signaled configuration. The request message 830 may be transmitted as, for example, an RRC configuration message or a MAC CE.

The base station 102 may determine whether to grant or deny the request message 830. For example, the base station 102 may deny the requested antenna array configuration if the base station 102 is unable to support the requested antenna array configuration given a current distribution of resources (e.g., transmit antennas). The base station 102 may transmit a response message 840 that indicates an antenna array configuration for the UE to use. When the base station 102 declines the requested antenna array configuration, the response message 840 may indicate a current antenna array configuration of the UE. When the base station 102 accepts the requested antenna array configuration, the response message 840 may indicate a number of reference signals to use for beam training with the requested antenna array configuration. For example, the response message 840 may indicate time and frequency domain resources when different reference signals 860 will be transmitted. The response message 840 may be transmitted as, for example, an RRC configuration message, a MAC CE, or a DCI.

At process block 850, the UE 104 may perform beam training for the requested antenna array configuration. That is, the UE 104 may change to the requested antenna array configuration as a new active antenna configuration. The UE 104 may measure each of the reference signals 860 using the new active antenna configuration to determine a best beam. For example, the best beam may be a beam used to transmit the one of the reference signals 860 having a best reference signal received power (RSRP). The UE 104 may transmit a beam training message 870 including a beam index of the best beam and a the RSRP of the best beam. Accordingly, the base station 102 may select the best beam to use for communication with the UE 104.

Figure 9:
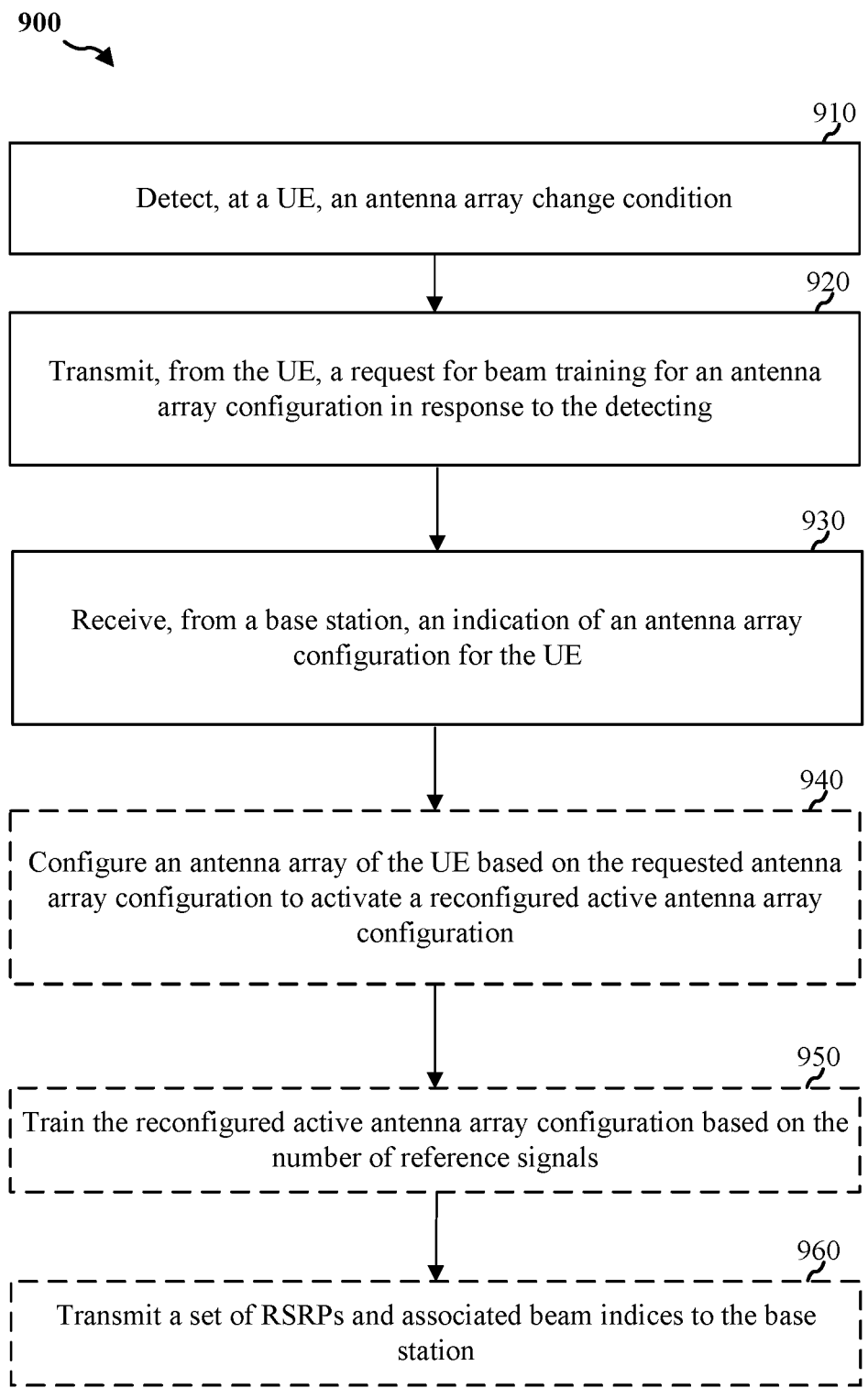
FIG. 9 is a flowchart of an example method of reconfiguring a UE antenna array for a UE.

FIG. 9 is a flowchart of a method 900 of wireless communication. The method 900 may be performed by a UE (e.g., the UE 104, which may include the memory 360 and which may be the entire UE 104 or a component of the UE 104 such as the antenna configuration component 140, TX processor 368, the RX processor 356, and/or the controller/processor 359). In an aspect, the method 900 may be performed in communication with a base station (e.g., the base station 102, which may include the memory 376 and which may be the entire base station 102 or a component of the base station 102, such as the antenna control component 198, TX processor 316, the RX processor 370, and/or the controller/processor 375). Optional blocks are illustrated in dashed lines.

At block 910, the method 900 may include detecting, at a UE, an antenna array change condition. In an aspect, for example, the UE 104, the RX processor 356, and/or the controller/processor 359 may execute the antenna configuration component 140 and/or the condition component 142 to detect, at the UE 104, an antenna array change condition. For example, the antenna array change condition may be based on an angular spread of dominant and sub-dominant clusters in a channel between the base station and the UE. For instance, the UE 104 may determine that a different active antenna array configuration may generate a beam that includes one or more additional clusters. As another example, the antenna array change condition may be based on a power consideration of the UE (e.g., a low battery condition). As another example, the antenna array change condition may be based on a thermal consideration of the UE (e.g., a temperature exceeding a threshold). As another example, the antenna array change condition may be based on support for additional radio-frequency chains utilizing a hybrid beamforming architecture. Accordingly, the UE 104, the RX processor 356, and/or the controller/processor 359 executing the antenna configuration component 140 and/or the condition component 142 may provide means for detecting, at a UE, an antenna array change condition.

At block 920, the method 900 may include transmitting, from the UE, a request for beam training for an antenna array configuration in response to the detecting. In an aspect, for example, the UE 104, the TX processor 368, and/or the controller/processor 359 may execute the antenna configuration component 140 and/or the request component 144 to transmit, from the UE, a request for beam training for an antenna array configuration (e.g., the request message 830) in response to the detecting. The request for beam training may include a requested antenna array configuration. The request for beam training may include an indication of beam weights to use with the requested antenna array configuration. For example, the indication of beam weights may be a pointer to an analog beamforming codebook index. Accordingly, the UE 104, the TX processor 368, and/or the controller/processor 359 executing the antenna configuration component 140 and/or the request component 144 may provide means for transmitting, from the UE, a request for beam training for an antenna array configuration in response to the detecting.

At block 930, the method 900 may include receiving, from a base station, an indication of an antenna array configuration for the UE. In an aspect, for example, the UE 104, the RX processor 356, and/or the controller/processor 359 may execute the antenna configuration component 140 and/or the reconfiguration component 146 to receive, from the base station 102, an indication of an antenna array configuration (e.g., antenna array configuration change response message 840) for the UE 104. When the base station approves the request, the indication of the antenna array configuration for the UE may indicate the requested antenna array configuration and a number of reference signals to use for beam training with the requested antenna array configuration. When the base station denies the request, the indication of the antenna array configuration may indicate the active antenna array configuration. Accordingly, the UE 104, the RX processor 356, and/or the controller/processor 359 executing the antenna configuration component 140 and/or the reconfiguration component 146 may provide means for receiving, from a base station, an indication of an antenna array configuration for the UE.

At block 940, the method 900 may optionally include configuring an antenna array of the UE based on the requested antenna array configuration to activate a reconfigured active antenna array configuration. In an aspect, for example, the UE 104, the RX processor 356, and/or the controller/processor 359 may execute the antenna configuration component 140 and/or the reconfiguration component 146 to configure the antenna array 410 of the UE 104 based on the requested antenna array configuration to activate a reconfigured active antenna array configuration. For instance, the reconfiguration component 146 may control one or more of the RFICs 430 to energize the antennas 420 that are in the active array of the requested antenna array configuration. For example, if the active antenna array configuration 510 is selected, the RFIC 430*b* may energize the antennas in the linear array. As another example, if the active antenna configuration 630 is selected, the RFICs 430*a* and 430*c* may energize the antennas in the distributed planar array. Accordingly, the UE 104, the RX processor 356, and/or the controller/processor 359 executing the antenna configuration component 140 and/or the reconfiguration component 146 may provide means for configuring an antenna array of the UE based on the requested antenna array configuration to active a reconfigured active antenna array configuration.

At block 950, the method 900 may optionally include training the reconfigured active antenna array configuration based on the number of reference signals. In an aspect, for example, the UE 104, the RX processor 356, and/or the controller/processor 359 may execute the antenna configuration component 140 and/or the training component 148 to train the reconfigured active antenna array configuration based on the number of reference signals. Accordingly, the UE 104, the RX processor 356, and/or the controller/processor 359 executing the antenna configuration component 140 and/or the training component 148 may provide means for training the reconfigured active antenna array configuration based on the number of reference signals.

At block 960, the method 900 may optionally include transmitting a set of reference signal received powers (RSRPs) and associated beam indices to the base station. In an aspect, for example, the UE 104, the TX processor 368, and/or the controller/processor 359 may execute the antenna configuration component 140 and/or the training component 148 to transmit the reference signal received power (RSRP) and associated beam index to the base station. Accordingly, the UE 104, the TX processor 368, and/or the controller/processor 359 executing the antenna configuration component 140 and/or the training component 148 may provide means for transmitting a reference signal received power (RSRP) and associated beam index to the base station. The base station 102 may utilize the RSRP and associated beam index to select a beam for transmission. The UE 104 may then receive transmissions from the base station 102 using the reconfigured active antenna array configuration.

Figure 10:
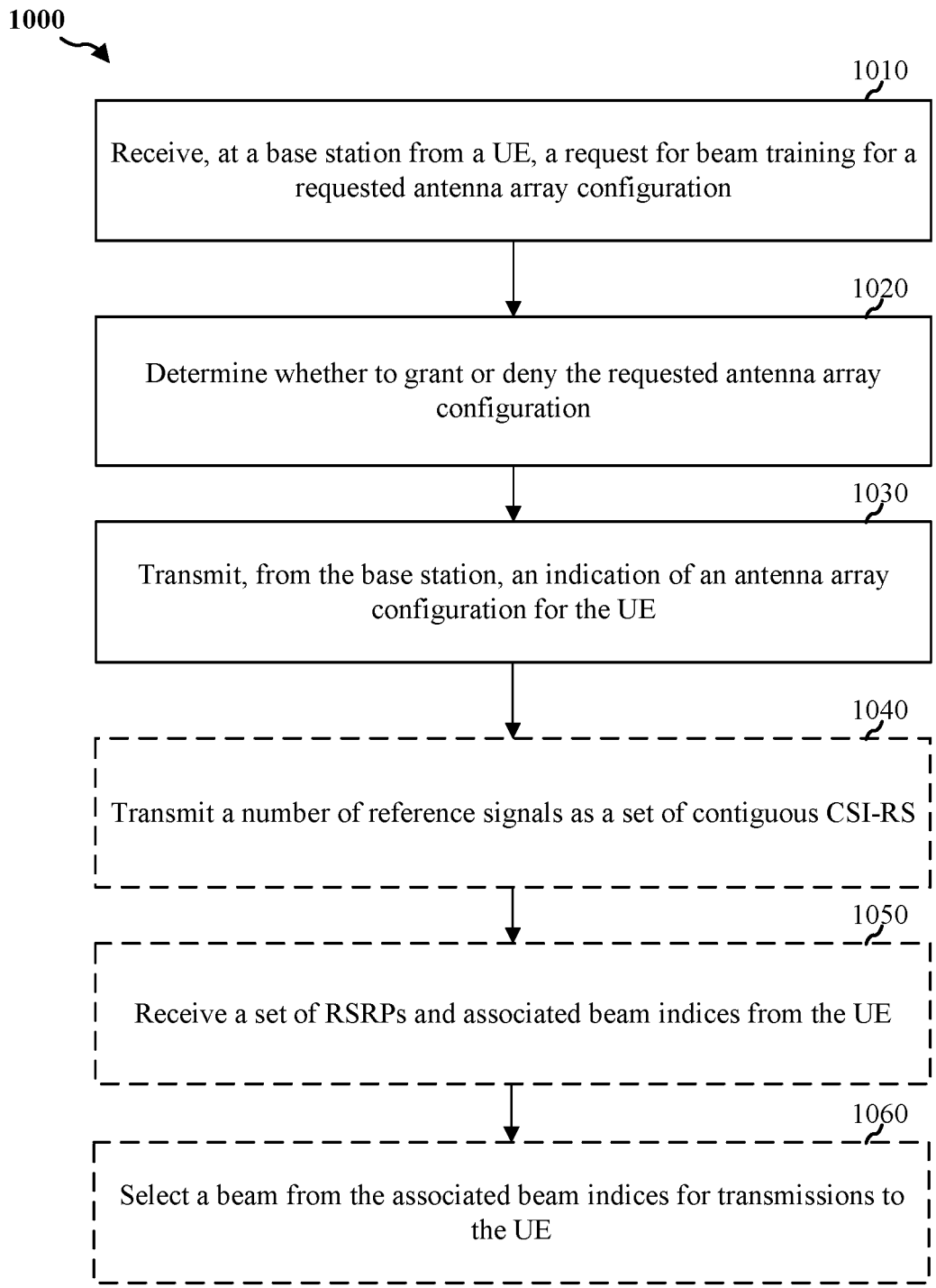
FIG. 10 is flowchart of an example method of reconfiguring a UE antenna array for a base station.

FIG. 10 is a flowchart of a method 1000 of wireless communication. The method 1000 may be performed by a base station (e.g., the base station 102, which may include the memory 376 and which may be the entire base station 102 or a component of the base station 102, such as the antenna control component 198, TX processor 316, the RX processor 370, and/or the controller/processor 375). In an aspect, the method 1000 may be performed in communication with a UE (e.g., the UE 104, which may include the memory 360 and which may be the entire UE 104 or a component of the UE 104 such as the antenna configuration component 140, TX processor 368, the RX processor 356, and/or the controller/processor 359). Optional blocks are illustrated in dashed lines.

At block 1010, the method 1000 may include receiving, at a base station from a UE, a request to change an active antenna array configuration of the UE to a requested antenna array configuration. In an aspect, for example, the base station 102, the RX processor 370, and/or the controller/processor 375 may execute the antenna control component 198 and/or the request component 1242 to receive, at the base station 102 from the UE 104, a request for beam training for a requested antenna array configuration. For example, the request for beam training may indicate support for additional radio-frequency chains utilizing a hybrid beamforming architecture. As another example, the request for beam training may include an indication of beam weights to use with the requested antenna array configuration. The indication of beam weights may be a pointer to an analog beamforming codebook index. Accordingly, the base station 102, the RX processor 370, and/or the controller/processor 375 executing the antenna control component 198 and/or the request component 1242 may provide means for receiving, at a base station from a UE, a request for beam training for a requested antenna array configuration.

At block 1020, the method 1000 may include determining whether to grant or deny the requested antenna array configuration of the UE. In an aspect, for example, the base station 102 and/or the controller/processor 375 may execute the antenna control component 198 and/or the evaluation component 1244 to determine whether to grant or deny the requested antenna array configuration of the UE. For example, the evaluation component 1244 may deny the requested antenna array configuration if the base station 102 is unable to support the requested antenna array configuration given a current distribution of resources (e.g., transmit antennas). For instance, the requested active antenna array configuration may require additional antennas at the base station to steer the beam. If the required antennas are being utilized for another UE or another frequency band, the evaluation component 1244 may deny the request. Accordingly, the base station 102 and/or the controller/processor 375 executing the antenna control component 198 and/or the evaluation component 1244 may provide means for determining whether to grant or deny the requested antenna array configuration of the UE.

At block 1030, the method 1000 may include transmitting, from the base station, an indication of an antenna array configuration for the UE. In an aspect, for example, the base station 102, TX processor 316, and/or the controller/processor 375 may execute the antenna control component 198 and/or the configuration component 1246 to transmit, from the base station 102, an indication of an antenna array configuration for the UE. Accordingly, the base station 102, TX processor 316, and/or the controller/processor 375 executing the antenna control component 198 and/or the configuration component 1246 may provide means for transmitting, from the base station, an indication of an antenna array configuration for the UE.

At block 1040, the method 1000 may optionally include transmitting a number of reference signals as a set of contiguous CSI-RS. In an aspect, for example, the base station 102, TX processor 316, and/or the controller/processor 375 may execute the antenna control component 198 and/or the training component 1248 to transmit the number of reference signals as a set of contiguous CSI-RS. Accordingly, the base station 102, TX processor 316, and/or the controller/processor 375 executing the antenna control component 198 and/or the training component 1248 may provide means for transmitting a number of reference signals as a set of contiguous CSI-RS.

At block 1050, the method 1000 may optionally include receiving a set of RSRPs and associated beam indices from the UE. In an aspect, for example, the base station 102, the RX processor 370, and/or the controller/processor 375 may execute the antenna control component 198 and/or the training component 1248 to receive the set of RSRPs and associated beam indices from the UE. Accordingly, the base station 102, the RX processor 370, and/or the controller/processor 375 executing the antenna control component 198 and/or the training component 1248 may provide means for receiving a set of RSRPs and associated beam indices from the UE.

At block 1060, the method 1000 may optionally include selecting a beam from the associated beam indices for transmissions to the UE. In an aspect, for example, the base station 102, TX processor 316, and/or the controller/processor 375 may execute the antenna control component 198 and/or the training component 1248 to select a beam from the associated beam indices for transmissions to the UE. That is, the training component 1248 may determine the antenna weights used to transmit the reference signal corresponding to the selected beam index and use those antenna weights for future transmissions to the UE. The training component 1248 may also select a transmit power based on the RSRP. Accordingly, the base station 102, the RX processor 370, and/or the controller/processor 375 executing the antenna control component 198 and/or the training component 1248 may provide means for selecting a beam from the associated beam indices for transmissions to the UE. The base station 102 may proceed with communications with the UE using the antenna array configuration for the UE and the information from beam training.

Figure 11:
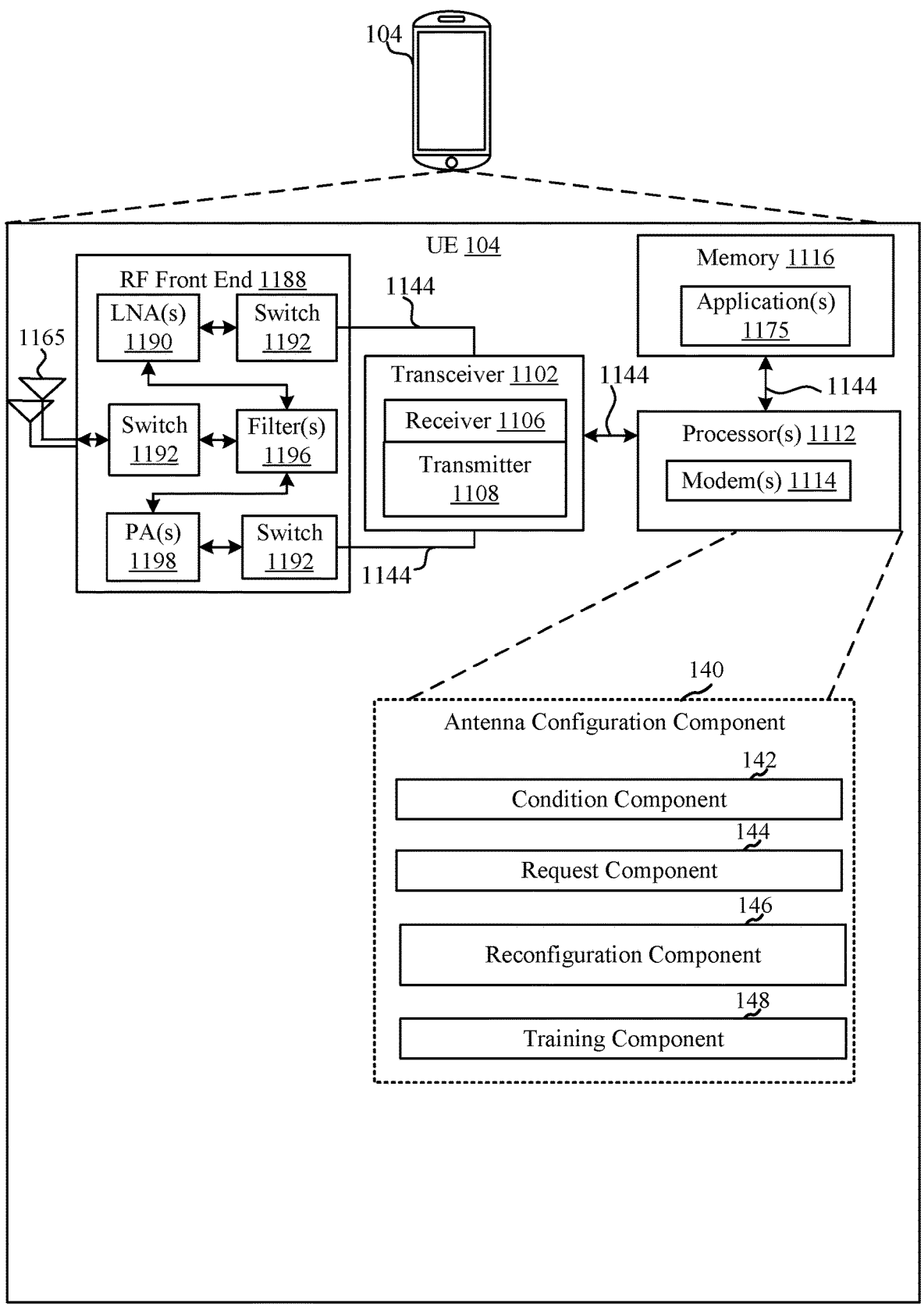
FIG. 11 is a schematic diagram of example components of the UE of FIG. 1.

Referring to FIG. 11, one example of an implementation of UE 104 may include a variety of components, some of which have already been described above, but including components such as one or more processors 1112 and memory 1116 and transceiver 1102 in communication via one or more buses 1144, which may operate in conjunction with modem 1114, and antenna configuration component 140 to enable one or more of the functions described herein related to configuring an active antenna array at a UE. Further, the one or more processors 1112, modem 1114, memory 1116, transceiver 1102, RF front end 1188 and one or more antennas 1165 may be configured to support voice and/or data calls (simultaneously or non-simultaneously) in one or more radio access technologies. The antennas 1165 may include one or more antennas, antenna elements, and/or antenna arrays.

In an aspect, the one or more processors 1112 may include a modem 1114 that uses one or more modem processors. The various functions related to antenna configuration component 140 may be included in modem 1114 and/or processors 1112 and, in an aspect, may be executed by a single processor, while in other aspects, different ones of the functions may be executed by a combination of two or more different processors. For example, in an aspect, the one or more processors 1112 may include any one or any combination of a modem processor, or a baseband processor, or a digital signal processor, or a transmit processor, or a receiver processor, or a transceiver processor associated with transceiver 1102. In other aspects, some of the features of the one or more processors 1112 and/or modem 1114 associated with antenna configuration component 140 may be performed by transceiver 1102.

Also, memory 1116 may be configured to store data used herein and/or local versions of applications 1175, antenna configuration component 140 and/or one or more of subcomponents thereof being executed by at least one processor 1112. Memory 1116 may include any type of computer-readable medium usable by a computer or at least one processor 1112, such as random access memory (RAM), read only memory (ROM), tapes, magnetic discs, optical discs, volatile memory, non-volatile memory, and any combination thereof. In an aspect, for example, memory 1116 may be a non-transitory computer-readable storage medium that stores one or more computer-executable codes defining antenna configuration component 140 and/or one or more of subcomponents thereof, and/or data associated therewith, when UE 104 is operating at least one processor 1112 to execute antenna configuration component 140 and/or one or more subcomponents thereof.

Transceiver 1102 may include at least one receiver 1106 and at least one transmitter 1108. Receiver 1106 may include hardware, firmware, and/or software code executable by a processor for receiving data, the code comprising instructions and being stored in a memory (e.g., computer-readable medium). Receiver 1106 may be, for example, a radio frequency (RF) receiver. In an aspect, receiver 1106 may receive signals transmitted by at least one base station 102. Additionally, receiver 1106 may process such received signals, and also may obtain measurements of the signals, such as, but not limited to, Ec/Io, SNR, RSRP, RSSI, etc. Transmitter 1108 may include hardware, firmware, and/or software code executable by a processor for transmitting data, the code comprising instructions and being stored in a memory (e.g., computer-readable medium). A suitable example of transmitter 1108 may including, but is not limited to, an RF transmitter.

Moreover, in an aspect, UE 104 may include RF front end 1188, which may operate in communication with one or more antennas 1165 and transceiver 1102 for receiving and transmitting radio transmissions, for example, wireless communications transmitted by at least one base station 102 or wireless transmissions transmitted by UE 104. RF front end 1188 may be connected to one or more antennas 1165 and may include one or more low-noise amplifiers (LNAs) 1190, one or more switches 1192, one or more power amplifiers (PAs) 1198, and one or more filters 1196 for transmitting and receiving RF signals.

In an aspect, LNA 1190 may amplify a received signal at a desired output level. In an aspect, each LNA 1190 may have a specified minimum and maximum gain values. In an aspect, RF front end 1188 may use one or more switches 1192 to select a particular LNA 1190 and its specified gain value based on a desired gain value for a particular application.

Further, for example, one or more PA(s) 1198 may be used by RF front end 1188 to amplify a signal for an RF output at a desired output power level. In an aspect, each PA 1198 may have specified minimum and maximum gain values. In an aspect, RF front end 1188 may use one or more switches 1192 to select a particular PA 1198 and its specified gain value based on a desired gain value for a particular application.

Also, for example, one or more filters 1196 may be used by RF front end 1188 to filter a received signal to obtain an input RF signal. Similarly, in an aspect, for example, a respective filter 1196 may be used to filter an output from a respective PA 1198 to produce an output signal for transmission. In an aspect, each filter 1196 may be connected to a specific LNA 1190 and/or PA 1198. In an aspect, RF front end 1188 may use one or more switches 1192 to select a transmit or receive path using a specified filter 1196, LNA 1190, and/or PA 1198, based on a configuration as specified by transceiver 1102 and/or processor 1112.

As such, transceiver 1102 may be configured to transmit and receive wireless signals through one or more antennas 1165 via RF front end 1188. In an aspect, transceiver 1102 may be tuned to operate at specified frequencies such that UE 104 can communicate with, for example, one or more base stations 102 or one or more cells associated with one or more base stations 102. In an aspect, for example, modem 1114 may configure transceiver 1102 to operate at a specified frequency and power level based on the UE configuration of the UE 104 and the communication protocol used by modem 1114.

In an aspect, modem 1114 may be a multiband-multimode modem, which can process digital data and communicate with transceiver 1102 such that the digital data is sent and received using transceiver 1102. In an aspect, modem 1114 may be multiband and be configured to support multiple frequency bands for a specific communications protocol.

In an aspect, modem 1114 may be multimode and be configured to support multiple operating networks and communications protocols. In an aspect, modem 1114 may control one or more components of UE 104 (e.g., RF front end 1188, transceiver 1102) to enable transmission and/or reception of signals from the network based on a specified modem configuration. In an aspect, the modem configuration may be based on the mode of the modem and the frequency band in use. In another aspect, the modem configuration may be based on UE configuration information associated with UE 104 as provided by the network during cell selection and/or cell reselection.

Referring to FIG. 12, one example of an implementation of base station 102 may include a variety of components, some of which have already been described above, but including components such as one or more processors 1212 and memory 1216 and transceiver 1202 in communication via one or more buses 1254, which may operate in conjunction with modem 1214 and antenna control component 198 to enable one or more of the functions described herein related to UE antenna configuration control.

The transceiver 1202, receiver 1206, transmitter 1208, one or more processors 1212, memory 1216, applications 1275, buses 1254, RF front end 1288, LNAs 1290, switches 1292, filters 1296, PAs 1298, and one or more antennas 1265 may be the same as or similar to the corresponding components of UE 104, as described above, but configured or otherwise programmed for base station operations as opposed to UE operations.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
   detecting, at a user equipment (UE), an antenna array change condition;
   transmitting, from the UE, a request for beam training for an antenna array configuration of a subset of active antennas in response to the detecting the antenna array change condition, wherein the request lbr beam training includes a request to change an active antenna array configuration of the UE to a requested antenna array configuration;
   receiving, from a base station, an indication of an antenna array configuration for the UE, wherein the indication of the antenna array configuration for the UE indicates the requested antenna array configuration and a number of reference signals to use for beam training with the requested antenna array configuration;
   configuring an antenna array of the UE based on the requested antenna array configuration to activate a reconfigured active antenna array configuration;
   training the reconfigured active antenna array configuration based on the number of reference signals, wherein the number of reference signals is a number of contiguous channel state information reference signals; and
   transmitting a set of reference signal received powers (RSRPs) and associated beam indices to the base station.

2. The method of claim 1, wherein the antenna array change condition is based on an angular spread of dominant and sub-dominant clusters in a channel between the base station and the UE.

3. The method of claim 1, wherein the antenna array change condition is based on a power consideration of the UE.

4. The method of claim 1, wherein the antenna array change condition is based on a thermal consideration or the UE.

5. The method of claim 1, wherein the antenna array change condition is based on support for additional radio-frequency chains utilizing a hybrid beamforming architecture.

6. The method of claim 1, wherein the request for beam training for the antenna array configuration includes an indication of beam weights to use with the requested antenna array configuration.

7. The method of claim 6, wherein the indication of beam weights is a pointer to an analog beam forming codebook index.

8. A method of wireless communication, comprising:
   receiving, at a base station from a user equipment (UE), a request for beam training for a requested antenna array configuration of a subset of active antennas;
   determining whether to grant or deny the requested antenna array configuration;
   transmitting, from the base station, an indication of an antenna array configuration for the UE, wherein the indication of the antenna array configuration for the UE indicates the requested antenna array configuration and a number of reference signals to use for beam training with the requested antenna array configuration; and
   transmitting the number of reference signals to use for beam training as a set of contiguous channel state information reference signals (CSI-RS).

9. The method of claim 8, wherein the request for beam training indicates support for additional radio-frequency chains utilizing a hybrid beamforming architecture.

10. The method of claim 8, wherein the request for beam training includes an indication abeam weights to use with the requested antenna array configuration.

11. The method of claim 10, wherein the indication of beam weights is a pointer to an analog beamforming codebook index.

12. The method of claim 8, further comprising:
    receiving a set of reference signal received powers (RSRPs) and associated beam indices from the UE; and
    selecting a beam from the associated beam indices for transmissions to the UE.

13. An apparatus for wireless communication, comprising:
    a memory; and
    one or more processors coupled to the memory and individually combination, configured to:
        detect, at a user equipment (UE), an antenna array change condition;
        transmit, from the UE, a request for beam training for an antenna array configuration of a subset of active antennas in response to the detecting the antenna array change condition, wherein the request for beam training includes a request to change an active antenna array configuration of the UE to a requested antenna array configuration;
        receive, from a base station, an indication of an antenna array configuration for the UE, wherein the indication of the antenna array configuration for the UE indicates the requested antenna array configuration and a number of reference signals to use for beam training with the requested antenna array configuration;
        configure an antenna array of the UE based on the requested antenna array configuration to activate a reconfigured active antenna array configuration;
        train the reconfigured active antenna array configuration based on the number of reference signals, wherein the number of reference signals is a number of contiguous channel state information reference signals; and
        transmit a set of reference signal received powers (RSRPs) and associated beam indices to the base station.

14. The apparatus of claim 13, wherein the antenna array change condition is based on an angular spread of dominant and sub-dominant clusters in a channel between the base station and the UE.

15. The apparatus of claim 13, wherein the antenna array change condition is based on a power consideration of the UE.

16. The apparatus of claim 13, wherein the antenna array change condition is based on a thermal consideration of the UE.

17. The apparatus of claim 13, wherein the antenna array change condition is based on support for additional radio-frequency chains utilizing a hybrid beamforming architecture.

18. The apparatus of claim 13, wherein the request for beam training for the antenna array configuration includes an indication of beam weights to use with the requested antenna array configuration.

19. The apparatus of claim 18, wherein the indication of beam weighs is a pointer to an analog beamforming codebook index.

20. An apparatus for wireless communication, comprising:
a memory; and
one or more processors coupled to the memory and individually or in combination, configured to:
receive, at a base station from a user equipment (UE), a request for beam training for a requested antenna array configuration of a subset of active antennas;
determine whether to grant or deny the requested antenna array configuration of the UE;
transmit, from the base station, an indication of an antenna array configuration for the UE, wherein the indication of the antenna array configuration for the UE indicates the requested antenna array configuration and a number of reference signals to use for beam training with the requested antenna array configuration; and
transmit the number of reference signals to use for beam training as a set of contiguous channel state information reference signals (CSI-RS).

21. The apparatus of claim 20, wherein the request for beam training indicates support for additional radio-frequency chains utilizing a hybrid beamforming architecture.

22. The apparatus of claim 20, wherein the request for beam training includes an indication of beam weights to use with the requested antenna array configuration.

23. The apparatus of claim 22, wherein the indication of beam weights is a pointer to an analog beamforming codebook index.

24. The apparatus of claim 20, wherein the one or more processors, individually or in combination, are configured to:
receive a set of reference signal received powers (RSRPs) and associated beam indices from the UE; and
select a beam from the associated beam indices for transmissions to the UE.

* * * * *